UNITED STATES PATENT OFFICE.

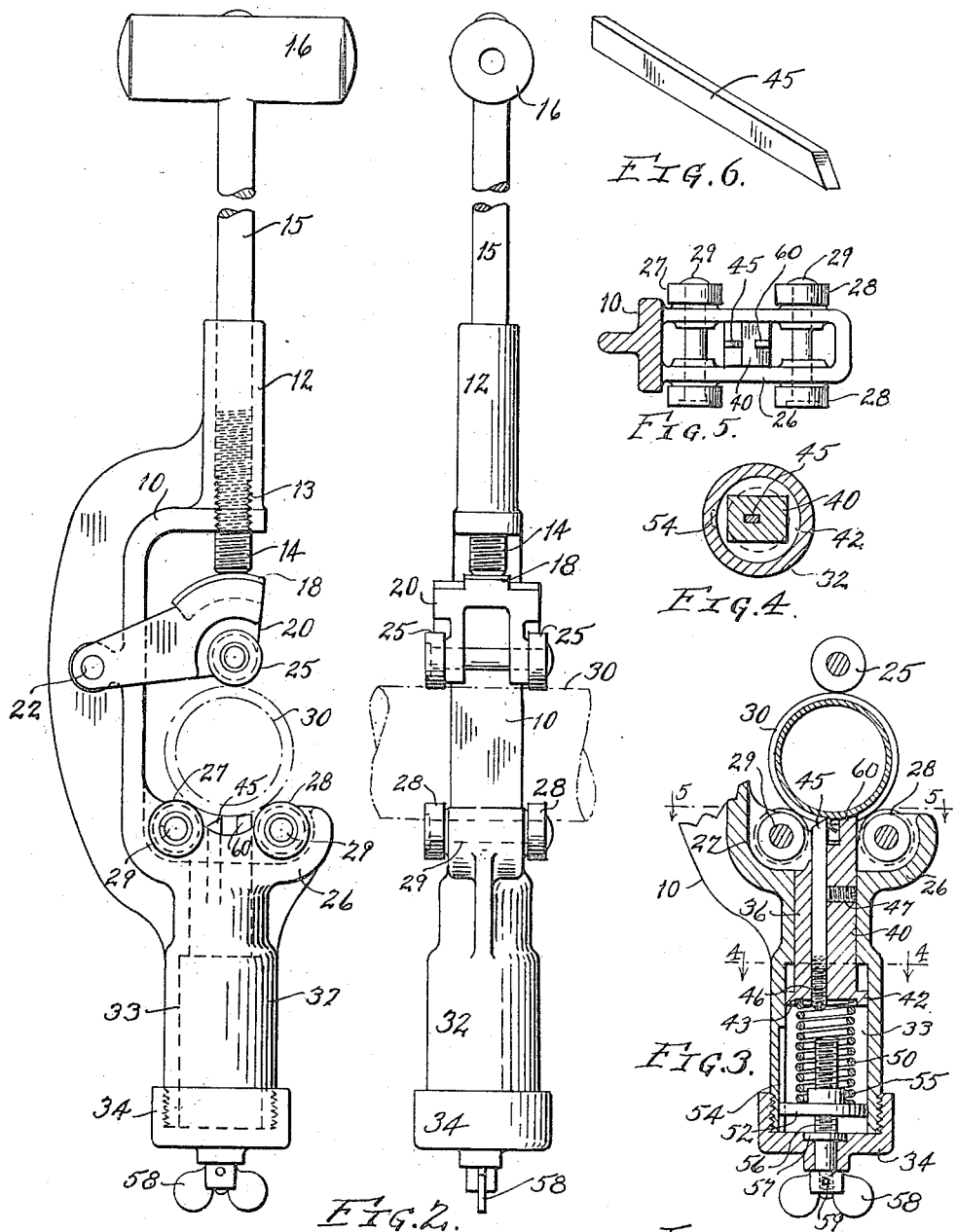

MORRIS CRAMER, OF CLEVELAND, OHIO.

PIPE-CUTTER.

1,215,120.    Specification of Letters Patent.    Patented Feb. 6, 1917.

Application filed September 28, 1916. Serial No. 122,621.

*To all whom it may concern:*

Be it known that I, MORRIS CRAMER, a citizen of the United States, residing at Cleveland, in the county of Cuyahoga and State of Ohio, have invented a certain new and useful Improvement in Pipe-Cutters, of which the following is a full, clear, and exact description, reference being had to the accompanying drawings.

The general object of this invention is to provide a simple, effective device for cutting metal tubes, such as pipes and the like, which may be convenient to operate, while being durable in service. Another object is to provide for automatically feeding a cutting tool into the tube or pipe while the device is revolved about it. A particular object is to so arrange the cutting tool as to avoid leaving burs either on the outside or the inside of the tube, where it is severed.

In carrying out my invention I use a frame, similar to the usual pipe cutter frame, and provide relatively adjustable separated rollers adapted to engage the exterior of various sizes of tubes and permit the cutter frame to revolve about the pipe, but such rollers are preferably cylindrical as distinguished from circular disks or knives which are ordinarily used to cut pipes. I provide means on the frame for urging a single cutting tool substantially radially toward the pipe, causing its cutting end to sever the pipe as the frame is revolved about it. A feature of this construction is that I may provide a housing for the mechanism feeding the cutting tool, which housing may also serve as a reservoir for oil to be fed to the cutting surfaces, facilitating the operation.

The above and other objects will become apparent in the following specification, which refers to the drawings, and the essential characteristics are summarized in the claims.

Referring to the drawings,

Figure 1 is a side elevation of my pipe cutter; Fig. 2 is an edge view of the same; Fig. 3 is a longitudinal section through the lower part of the device, illustrating the arrangement of the cutting tool and its feeding mechanism; Fig. 4 is a transverse section through the member carrying the cutter and the housing, the view being taken substantially on the plane indicated by the line 4—4 in Fig. 3; Fig. 5 is a horizontal section substantially on the line 5—5 of Fig. 3, showing the cutting tool and two of the rollers, and Fig. 6 is a perspective view of the cutting tool itself.

Referring to the drawings by numerals, the frame of my cutter comprises a substantially C-shaped member 10, having an outwardly extending boss 12 provided with internal threads 13 adjacent its lower end engaging a threaded portion 14 on an adjusting rod 15, provided with a suitable handle indicated at 16. The lower end of this rod bears against a convex rib 18 on a stirrup 20 having laterally extending arms embracing the connecting or bridge portion of the frame and pivoted at 22, whereby this stirrup may swing about a pin extending through the boss in the frame member. The stirrup is shown as carrying a pair of axially alined separated rollers 25 adapted to bear against the exterior of the pipe indicated in broken lines at 30. Opposite the boss 12 is a trough-shaped portion 26 of the frame, opening toward the rollers 25 and carrying axially separated pairs of rollers 27 and 28 mounted on pins 29 carried by the sides of the trough-like member.

The arrangement of the stirrup 20 with its movable rollers and the specific arrangement of the other rollers shown are merely illustrative of any convenient construction for permitting the rotation of the pipe cutter about the pipe. However, the arranging of the rollers in axially separated pairs is a necessary and desirable feature, as will be hereinafter explained.

Extending downwardly from the member 26 is a hollow casing 32 having a cylindrical bore 33 opening downwardly and closed at its lower end by a cap 34 threaded on the exterior of the casing. This bore 33 is connected with the space inside of the trough-member 26 by an angular passage 36 into which is slidably fitted a tool carrier 40. The body of this tool carrier is preferably rectangular and fits the passage 36, and is provided with an enlarged circular head 42 slidably embracing the bore 33 and has on its lower face a circular depression 43 into which is seated one end of a compression spring 50, adapted to urge the tool carrier toward the pipe. The tool carrier is provided with a longitudinal rectangular passage, into which is closely fitted the cutting tool 45, which may be adjusted longitudinally of the carrier by a screw 46 threaded into the outer end of the carrier and bearing against the end of the cutting tool. A screw 47 is threaded transversely into the carrier and serves to lock the cutting tool with relation thereto.

As a means for adjusting the spring 50 to increase or lessen the actuating pressure against the tool carrier, I have shown a plunger-like member 52 slidably fitted in the bore 33 and having a laterally extending lug engaging a vertical guide slot 54. This plunger is provided with an upwardly extending boss 55, positioning the outer end of the spring 50 and also has a central threaded opening engaging threads on a screw 56. The screw is provided with an enlarged shoulder 57 rotatably fitting a recess in the cap 34, and has a shank extending outwardly through the cap, while the outer end of the screw is threaded and receives a thumb nut 58, preferably secured in position by a pin 59. It will be seen that by rotating the thumb nut the screw 56 may be rotated in either direction to move the plunger 52 toward or away from the tool carrier, thereby increasing or lessening the actuating pressure.

The tool 45 is preferably substantially rectangular in cross section and has its upper end beveled transversely of the tool, providing a suitable cutting edge. It is desirable in cutting tubes of certain kinds of metal to provide means preventing the tool feeding too rapidly into the work. This I may accomplish by an upstanding finger 60 on the carrier 40 in transverse alinement with the tool and so arranged that it may bear in the groove made by the tool, just ahead of the tool, limiting its inward movement. This operation is illustrated in Fig. 3, where the metal is shown as being turned outwardly from the pipe 30, shown as about half cut through.

The operation of my invention is as follows: The cutter frame is placed over the pipe bringing the tool and finger 45 and 60 respectively on one side of the pipe, and the rollers 25 on the other, and the tool, which normally stands in its innermost position, is forced outwardly compressing the spring 50 by turning the handle 16 until the rollers 25, 28 and 27 closely engage the exterior of the pipe, as shown in the drawings. Now by rotating the cutter frame about the pipe in the proper direction the cutter 45 quickly cuts a narrow groove into the exterior, which deepens until it severs the pipe without leaving a bur outstanding or projecting inwardly at the end of either section. By reason of this cutting tool actually cutting the metal to sever the pipe, metal chips are turned outwardly, as indicated in Fig. 3, and, as these chips break off, they are permitted to fall away from the pipe without coming into the path of the rollers, and those chips which adhere to the pipe, by reason of oil being used to lubricate the cutting, are between the paths of the rollers which are shown as axially separated from the groove being cut.

As an incident to the use of the wedge-shaped cutting disks for severing pipes, it is usually necessary to remove a large hardened bur from the exterior of the severed end before cutting threads on the same, and a similar bur turned inwardly at the severed end, if not removed, forms a resistance to any fluid which the pipe is later used to conduct.

It is desirable while cutting pipes to use a lubricant at the surfaces being cut. This usually requires repeated application of oil with an oil can, the operator stopping the rotating movement and applying oil with the can at frequent intervals while severing the pipe. With my device the bore 33 provides a chamber which may be filled with lubricant when the cap 34 is removed, and this lubricant finds its way in proper quantities to the cutting surface along the edges and sides of the cutting tool 45. The screw 47 forcing the tool to one side of its opening, leaves a space along the adjacent side leading the oil to the cutting edge of the tool.

From the foregoing description it will be seen that I have provided a cutting tool for tubes or pipes, which is adapted to sever the pipe by clean cutting action, instead of a distortion of the metal. It is automatically lubricated and is comparatively easy to operate. It eliminates the practice of constantly turning the handle 16 to force a cutting roller or rollers into the pipe, for with my cutting device once the rollers are set in engagement with the exterior of the pipe the operator need only rotate the cutter a few turns to sever the pipe.

Having thus described my invention, what I claim is:

1. In a pipe cutter, the combination of a frame adapted to be revolved about a pipe, a cutting tool carried by the frame and having a narrow cutting edge, yielding means for urging the cutting tool toward the pipe whereby it may sever the same by cutting the metal of the pipe while the frame is revolved there about, and a guide for the pipe independent of such yielding means.

2. The combination, with a pipe cutter frame adapted to embrace and be revolved about a pipe, of a tool for actually cutting the metal of the pipe and carried by said frame, a compression spring for urging said tool into the pipe to cut the same as the frame is revolved about the pipe, and guides for the revolving pipe independent of the action of said spring.

3. In a pipe cutter, the combination of a frame for revolubly embracing a pipe, a cutting tool carried by the frame, a compression spring for urging said cutting tool into the pipe as the frame is revolved about the pipe, guide rollers mounted on fixed axes, and means for adjusting the compression of said spring.

4. In a pipe cutter, the combination of a frame, a pair of fixed axially separated rollers and a movable roller with means for adjusting it toward and away from the other rollers whereby they may engage pipes of different sizes, a cutting tool carried by the frame adjacent the fixed rollers, and adjustable means for yieldingly urging said tool into the pipe.

5. In a pipe cutter, the combination of a frame, rollers carried thereby for revolubly embracing the exterior of a pipe, a substantially radially movable cutting tool having a narrow cutting edge, a member movable with the tool and adapted to engage the metal of the pipe ahead of the tool, and yielding means for urging said tool and member toward the pipe, said tool being adapted to cut a groove in the exterior of the pipe which deepens to sever the pipe as the cutter is revolved, said member limiting the inward movement of the tool by engaging the metal ahead of the same in said groove.

6. In a pipe cutter, the combination of a frame, means carried by the frame for revolubly embracing the exterior of a pipe, a cutting tool, means for urging said cutting tool into the pipe to sever the same by actually removing metal therefrom, an oil chamber carried by the frame, and means for leading the oil from the chamber to the surfaces being cut.

7. In a pipe cutter, the combination of a frame, means carried thereby for revolubly engaging a pipe, a radially movable cutting tool adapted to cut the metal by removing the same, a spring for urging said tool toward the pipe, a housing on the frame for said spring providing a reservoir adapted to contain oil, and a member carrying the tool closing the housing and having a passage for leading oil to the cutting edge of the tool.

8. In a pipe cutter of the character described, the combination of a frame, axially separated permanent positioned rollers carried by the frame, a movable roller and means for adjusting it toward and away from said separated rollers for revolubly embracing pipes of different sizes, a cutting tool, a movable member slidably carried by the frame and adapted to carry the tool substantially radially toward the pipe, a spring bearing against said member and urging the tool toward the pipe, a chamber in which said spring is mounted, a plunger in the chamber, a cap closing the chamber and rotatably carrying a screw member, and means in the chamber engaging the end of the spring and threaded onto said screw for adjusting its tension.

9. In a pipe cutter, the combination of a frame, two pairs of separated rollers mounted on fixed axes, the rollers of each pair being separated, a pair of longitudinally separated movable rollers carried by the frame, means for adjusting the last named rollers toward and away from the other rollers to engage different sizes of the pipe, a cutting tool carried by the frame and adapted to remove metal from the pipe as the frame is revolved about the same, said tool being positioned to operate in a path between the paths of the several rollers.

10. The combination with a pipe cutter frame adapted to be revolved about a pipe, of a cutting tool carried by said frame, a spring for urging the tool into the pipe, and guides for the pipe free from the influence of said spring and adapted to engage the pipe at points on opposite sides of the path of travel of the cutting tool.

11. The combination with a pipe cutter frame adapted to be revolved about a pipe, of a cutting tool carried by said frame, a spring for urging said tool into the pipe, means for adjusting the force of the spring, and guides for the pipe independent of the spring and adapted to engage the pipe at points respectively in advance of and behind the cutting tool.

12. The combination with a pipe cutter frame adapted to be revolved about a pipe, of a cutting tool carried by the frame, a spring adapted to force said tool into the pipe, and roller guides adapted to engage the pipe at four separated points respectively in advance of and behind the cutting tool and on opposite sides of its path.

In testimony whereof, I hereunto affix my signature.

MORRIS CRAMER.

Copies of this patent may be obtained for five cents each, by addressing the "Commissioner of Patents, Washington, D. C."